Nov. 25, 1947.　　R. G. OWEN ET AL　　2,431,581
MILLING MACHINE CUTTER
Filed Sept. 27, 1944　　2 Sheets-Sheet 1
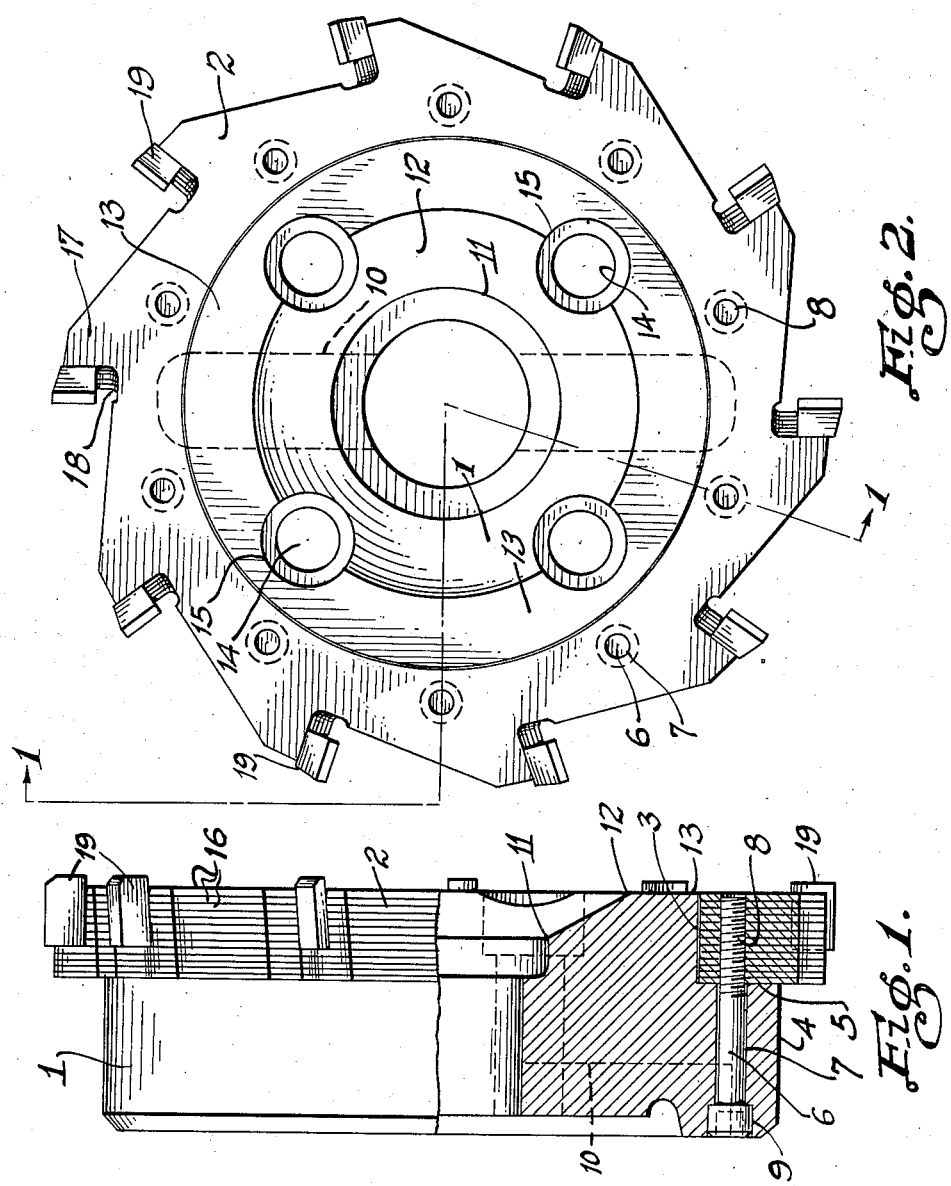
ROBERT G. OWEN INVENTORS.
and EARL H. HOWARD
BY
ATTORNEY.

Nov. 25, 1947.  R. G. OWEN ET AL  2,431,581
MILLING MACHINE CUTTER
Filed Sept. 27, 1944  2 Sheets-Sheet 2
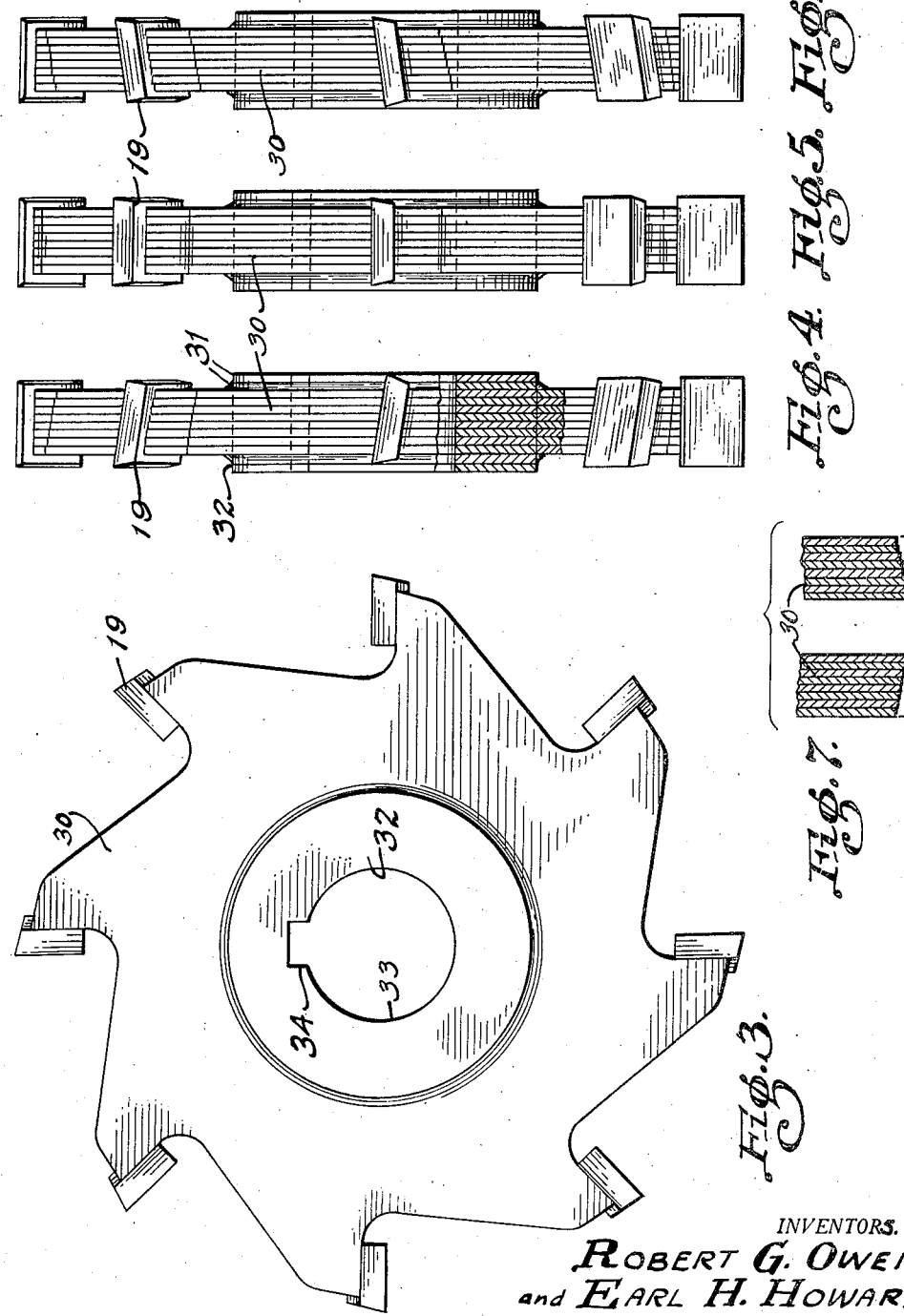
INVENTORS.
ROBERT G. OWEN
and EARL H. HOWARD
By
ATTORNEY.

Patented Nov. 25, 1947

2,431,581

UNITED STATES PATENT OFFICE 2,431,581

MILLING MACHINE CUTTER

Robert G. Owen, Sherman Oaks, and Earl H. Howard, La Canada, Calif.

Application September 27, 1944, Serial No. 555,963

3 Claims. (Cl. 29—103)

This invention relates to cutters broadly, and more specifically to the milling machine type.

At the present time, certain milling machine cutters are made of expensive tool steel which must be machined from solid stock properly heat treated and which cutters are subject to the danger of cracking while being hardened. Other milling cutters contemplate the use of a body with insertable teeth which may be replaced as necessary. While such a structure overcomes the danger of cracking, as mentioned aforesaid, still this type of cutter is relatively expensive, as the body and inserts are suited for only one purpose—milling. Each cutter is a single purpose cutter.

An object of the present invention is the provision of a milling machine cutter which is economical in cost of manufacture, and which has numerous advantages in actual use and service over cutters now known to the inventors. Among these advantages may be named that of vibration dampening during actual use of the cutter.

We have found that a cutter body of laminated steel is superior in actual use and service to so-called solid or cast cutter bodies. In the first place, we may blank out on a punch press, or other pressure shearing machine, the lamination plates of a selected diameter or diameters. These lamination plates may thereafter be bound together in any suitable manner, such as by copper brazing. Quite obviously, the thickness of the cutter body will be governed by the number of laminations and we can, therefore, produce thin cutter bodies, or thick cutter bodies, dependent upon the character of work upon which a milling operation is to be performed.

A further object of our invention is the provision of a cutter body which requires no special jigs or fixtures to fabricate to different thicknesses.

An object of our invention is the provision of a milling cutter wherein the body may be prefabricated in such a manner as to allow a shifting of the body portions to give any desired rake to the cutter portion.

With reference to the foregoing object, by stamping or otherwise forming the laminations of the cutter body, the laminations may be relatively shifted on a common axis to give positive, negative, or neutral rake to any tip or tips cemented or otherwise secured to the cutter body.

We contemplate as a further feature of our invention, a cutter body which carries a cutter ring, the cutter ring being detachably secured to the body. Such a ring permits removal from the body without removing the body from the milling machine. Thus, if any of the cutting elements on a cutter ring becomes damaged or the cutters become dull, the ring may be rapidly detached from the body and replaced by a new ring. Furthermore, the ring construction is such as to allow different type rings to be placed on the body, as a left hand or right hand cutter ring is adaptable to the same body. It also has the advantage that different rings may carry different amounts of cutting tips having different rake angles and clearance angles, all depending upon the work to be performed. Thus, the actual user of a cutter of this type would need but one body with a number of replaceable cutting rings, which are interchangeable on the cutter body. This permits machines to be kept on continuous production without the added expense of having to buy a quantity or quantities of complete cutters, (body and inserts designed and built for only one specific material or milling job) in order to keep one cutter in use while others are in transit to, in, or from grinding or re-tipping, by merely removing one ring and installing another on the cutter bodies. An interchangeable cutter ring eliminates the handling of a heavy cutter to and from grinding or re-tipping, and the lighter ring facilitates grinding, in that it is much easier to set up on the grinding machine and is of much less weight, requires less storage space, and is less apt to be damaged in handling.

It is, therefore, apparent to those who use milling machine cutters, that a complement of cutters of the type just described with replaceable rings, may be purchased quite cheaply as compared to a complement of complete cutters with tips of different forms and sizes. We have estimated and found that a cutter body with six replaceable cutter rings could be purchased for the equivalent of two complete cutters with tips of the type now generally available. Thus, six cutters for the price of two conventional type cutters, with replacements equally less expensive.

In the drawings:

Figure 1 is an end elevation, partly in section, on the line I—I of Figure 2, of one form of cutter, Figure 2 is a face view of the cutter shown in Figure 1, Figure 3 is a modified form of the cutter, being a face view thereof, Figures 4, 5 and 6 are end elevations of the cutter shown in Figure 3, the tips of which are arranged at different helical angles, viz: positive, neutral, and negative, respectively, and, Figure 7 is a fragmentary sectional view illustrating shifting of the laminations in order to accommodate tips at different helical angles.

Referring to the drawings, and specifically to the form of the invention illustrated in Figures 1 and 2, we provide a cutter body 1 adapted to detachably carry a cutter ring 2. The arrangement is such that the cutter body may accommodate, under certain conditions, cutter rings of various diameters and thicknesses. Such a construction allows a ready change of rings when for any reason the cutter tips become damaged or dulled and must be replaced for other reasons. It has also the advantage that either a right or left hand cutter may be placed upon the cutter body and secured thereto. In this manner, it is only necessary to carry replaceable cutter rings with different cutting tips in stock for any class of work to be performed by the cutter. Specifically, the cutter body 1 is formed with two coaxial portions of different diameter, as shown at 3 and 4. This construction results in a seat or shoulder 5. It is upon the portion of lesser diameter 3 that the cutter ring is placed and held in working relationship in any suitable manner, such as by machine screws 6, of which there may be a plurality, equidistantly spaced apart. Specifically, the screws are passed through transverse bores 7 in Figure 1, for threaded engagement with the cutter body or the cutter ring, as shown at 8. The screw heads are preferably received in a counter-bored portion 9 so as not to project beyond a surface of the cutter body or cutter ring. Machine screws of the type shown are well known commercially.

The body 1 is provided with a diametric slot 10 on its rear surface and provided on its front surface with a counterbore 11, with an annularly beveled portion 12 extending between the front face 13 and the counterbore 11. Said body is provided with a plurality of equidistantly spaced transverse bores 14, which may be counter-bored as indicated at 15. The body is preferably forged or machined from any suitable material, whether it be metal or plastic, to fit #40 or #50 or other desired taper spindles.

The cutter ring 2 is formed of metal, forging, solid plate steel, or $\tfrac{1}{16}$ sheet steel, the same being blanked out in any suitable manner, such as by a punch press, hydro press, or other pressure shearing machine, to the diameter or diameters selected. The diameters of the rings may range from small to a large size without affecting the thickness, as the thickness is governed by the number of lamination blanks used. Thus, a 10-inch cutter may range from ¼ inch in thickness to over 3 inches in thickness, without the necessity of using special jigs or fixtures to fabricate the different thicknesses. In Figure 1, it will be seen that a number of laminations 16 have been grouped together to produce the cutter ring. These laminations have previously been cut to proper form, as for instance indicated by the several lobes or teeth 17. However, all of said laminations for the cutter shown in Figures 1 and 2 are of the same form. These laminations may be relatively shifted on a common axis to vary the helix or shear angle. This variation is illustrated for the cutter shown in Figure 3, in Figures 4, 5 and 6. Having selected the proper shear angle for the cutter ring to be manufactured, the laminations are arranged together and properly locked through the simple expedient of drilling a few rivet holes through the blanks and inserting rivets to hold the laminations together. Thereafter, the laminations may be bound together by copper brazing or other means. By way of example, copper brazing may be performed on the laminations utilizing a long furnace which is controlled as to atmosphere, with the parts traveling through the furnace on a mechanized track, with the temperature in the furnace above the melting point of the copper and below the melting point of the steel. Such procedure is well understood by those skilled in the art. After the laminations have been brazed together, or welded, as desired, the surfaces to which the inserts are to be attached are broached, milled, or ground. It is apparent that where a laminated construction is utilized that less metal is lost in the broaching operation or milling operation than would be lost if the cutter ring was forged, or from solid stock. In the case of solid material, the helical angle would have to be machined or ground in each lobe or tooth with consequent waste of time and metal, whereas with the laminated construction, a shifting of the laminations prior to brazing or welding the same is all that is required. During the broaching operation, we also provide for gullets such as indicated at 18. The broaching or grinding permits the inserting of cutter tips at desired rake angles at peripheral edges and sides. The cutting tips 19 are secured to the broached or ground surface of each lobe or tooth by brazing, welding, soldering or shrinking, in the well understood manner. After the cutter ring has been formed as stated, the back face thereof, which fits against surface 5 of the cutter body, is ground, and the internal surface of the ring also ground if necessary, to the end that it will fit the cutter body. The cutter tips are ground to the desired rake angles, primary and secondary lands, etc., utilizing a master grinding fixture, to the end that interchangeability of rings with cutter bodies is assured.

The face type cutter shown in Figures 1 and 2 is readily mounted on a milling machine. Thus, the cutter body 1 is secured to an arbor which carries an adapter ring, the adapter ring having a key for reception in the diametric slot 16. The adapter is provided with screw-threaded bores, whereby machine screws passed through bores 14 in the body may hold the body to said adapter. Torque is, of course, communicated through the key received in the groove 19. The arbor or spindle is passed through the central bore of the body and has nuts threaded on its end, the nuts being received within the counterbore 11. It will be seen that the cutter as an entirety is very rigidly secured to the milling machine spindle.

In the form of the invention illustrated in the remaining figures, the cutter body 30 is of laminated construction. Laminations for these cutters may be made from the material left by the center blank of the large face mills to size desired. These laminations are bound together and secured by brazing in the manner which has been described for the cutter ring shown in Figures 1 and 2. Spacer rings 31 and 32 are shown on opposite sides of the body in Figure 4, and in this figure, we have illustrated how the laminations may be shifted prior to brazing to provide different helical angles for the cutter tips. For instance, in Figure 4, the laminations are shifted so as to give the cutter tips a positive helical angle. In Figure 5, the cutter tips are at a neutral angle, and in Figure 6, at a negative angle. As before, when the desired diameter of laminations have been punched or otherwise formed, and these laminations assembled to a desired thickness for a cutter to be constructed, the laminations, together with their spacer rings may be secured together by brazing, welding, or otherwise. The hub surfaces are ground to true the same; the arbor hole 33 is ground or broached. The usual keyway 34 is provided for the cutter by broaching. Thereafter, inside surfaces of the teeth or lobes are broached or ground and the tips secured to the broached or ground surfaces by cementing or otherwise. In the present form of the invention, the cutter tips extend beyond the sides of the body. This form is commonly known as a side or standard mill cutter. After the tips have been cemented in place, the cutter tips are ground to the proper clearance, rake or position of primary and secondary lands, as desired. This type of cutter is placed on the usual arbor with a key fitted within the keyway to assure a positive drive therefor.

The operation, uses and advantages of the invention just described are as follows:

By laminating the body, the cutter body in that form of the cutter shown in Figures 3 to 7, inclusive, or by laminating the ring in that form of cutter shown in Figures 1 and 2, we are enabled to save material by using center blank from 1 and 2 to make the cutter body of Figures 3 to 7, to reduce the cost of manufacture, and to provide a superior cutter. The individual laminations of a given diameter may be shifted, as illustrated in Figure 7, to produce either a positive or negative helical angle. This makes the construction of a cutter relatively simple, in that it only requires a proper selection of diameter and rake angle prior to assembling the laminations to a given thickness, shifting the same, and then securing the laminations by brazing. The work that follows, such as broaching the tip-receiving surfaces, arbor hole and keyway, is of a simple character, and may be performed by a relatively inexperienced operator. Furthermore, we may provide, through the use of a laminated body, for various types of cutters, such as stagger-tooth side mill cutters, in which instance, every other lobe of a lamination would be blanked out, followed by alternating the lobs to a position opposite each other on the cutter body sides. A staggered tooth side mill cutter may be fabricated by forming the lobes or laminations in such a manner as to resemble a saw-tooth set, and thereafter placing the blanks together so that the set of lobes will alternate in location around the cutter body.

In the case of the face cutter shown in Figures 1 and 2, this type of construction readily does surface, internal, concave and convex milling, and ordinarily such a type of mill is of greater size, that is, as to diameter and thickness, then the type of mill shown in Figures 3 to 7, the form of mill in Figures 3 to 7 being used for lighter work.

The type of milling cutter shown in Figures 1 and 2 permits machines to be maintained in continuous production for the reason that it is a simple matter to replace the ring with a new one, or with a ring having a different cutter type, greater or lesser amount of cutting tips or of different shearing angles, negative or positive rake; in short, to suit the material or job at hand.

We may use any type of tip, whether it be high speed steel, carbide, tungsten carbide, stellite, or other alloy. In actual cutting operation, it is a known fact that milling cutters are subject to shock, and we have found that cutters of the type of this invention, through the use of laminated bodies, affords a vibration-dampening effect or resiliency to the cutting tips. Furthermore, the relatively inexpensive cutter ring allows many to be carried in stock, and either left or right hand rings may be provided, dependent upon the direction of rotation of the milling machine, not to overlook the fact that cutter rings may be supplied with cutter tips most suitable for the material to be milled.

We claim:

1. A milling cutter including a body formed for attachment to a milling machine having an annular shoulder, an annular cutter ring formed of a plurality of similar peripherally toothed ring blanks secured together as a unit slidably mounted on said shoulder, cutter tips secured to the toothed portions of the ring, and means for detachably securing the cutter to the body.

2. In a milling cutter an annular cutter ring adapted to be detachably secured to a cutter body, said ring being formed of a plurality of similar peripherally toothed ring blanks secured together as a unit, and cutter tips secured to the toothed portions of the rings.

3. In a milling cutter an annular cutter ring formed of a plurality of identical sheet metal blanks having peripherally spaced teeth receiving recesses and adapted to be detachably connected to a cutter body, the blanks being arranged to form shoulders in the recesses of variable angularity, means for securing the blanks together to form a rigid unitary structure, and cutter tips cemented to said shoulders.

ROBERT G. OWEN.
EARL H. HOWARD.

REFERENCES CITED

The following references are of record in the file of this patent:

UNITED STATES PATENTS

| Number | Name | Date |
|---|---|---|
| 1,571,559 | Smith | Feb. 2, 1926 |
| 1,904,100 | Taylor | Apr. 18, 1933 |
| 2,119,298 | Simowski | May 31, 1938 |
| 1,965,950 | Walker | July 10, 1934 |
| 2,350,974 | Grayson | June 6, 1944 |
| 2,346,706 | Stoner | Apr. 18, 1944 |
| 1,047,205 | Gorton | Dec. 17, 1912 |
| 1,952,656 | Cecil | Mar. 27, 1934 |

FOREIGN PATENTS

| Number | Country | Date |
|---|---|---|
| 331,179 | France | July 21, 1903 |
| 49,633 | Germany | Aug. 25, 1911 |
| 172,899 | Great Britain | Dec. 22, 1921 |